May 17, 1938.  B. W. KING  2,117,847
SCALE
Filed April 4, 1936    4 Sheets-Sheet 2
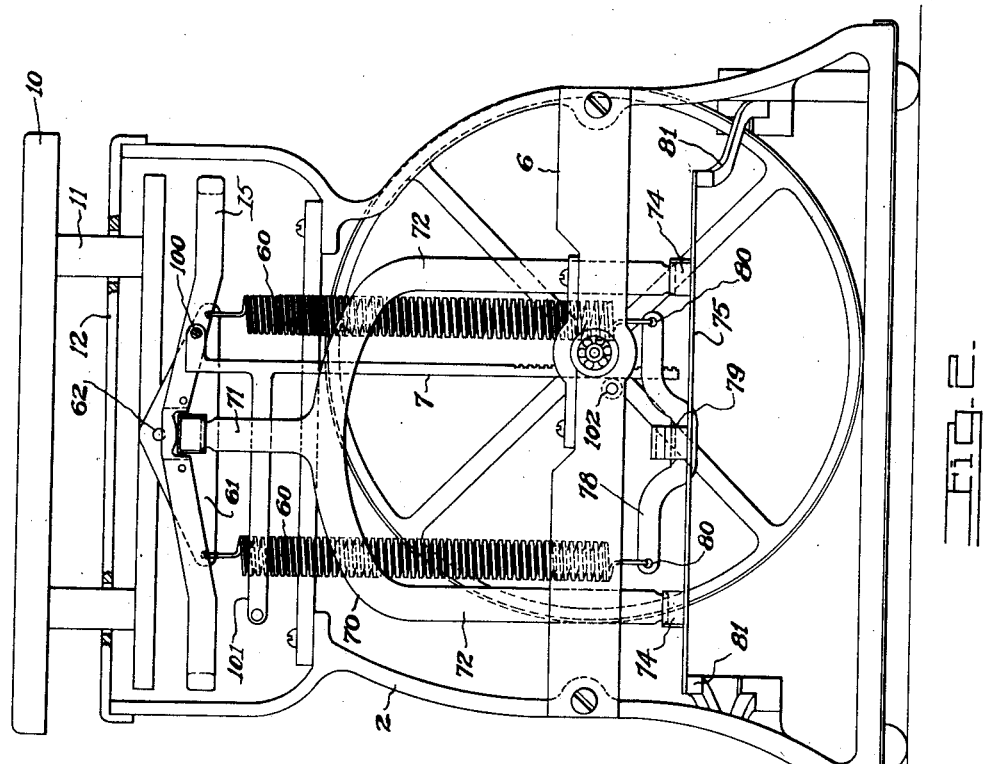
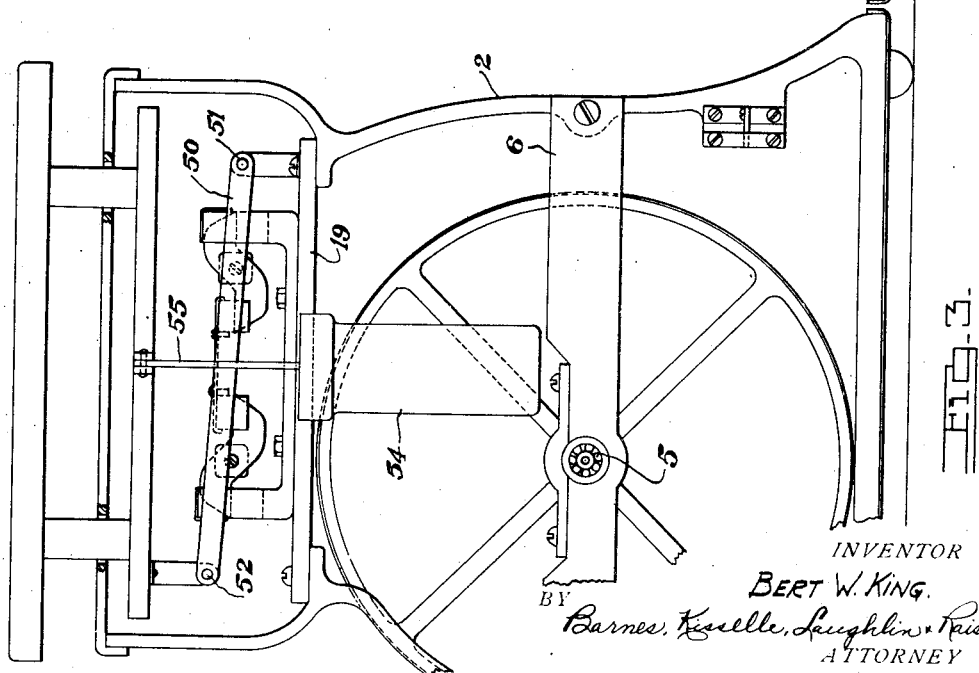
INVENTOR
BERT W. KING.
BY
Barnes, Kisselle, Laughlin & Raisch
ATTORNEY May 17, 1938.    B. W. KING    2,117,847
SCALE
Filed April 4, 1936    4 Sheets-Sheet 3

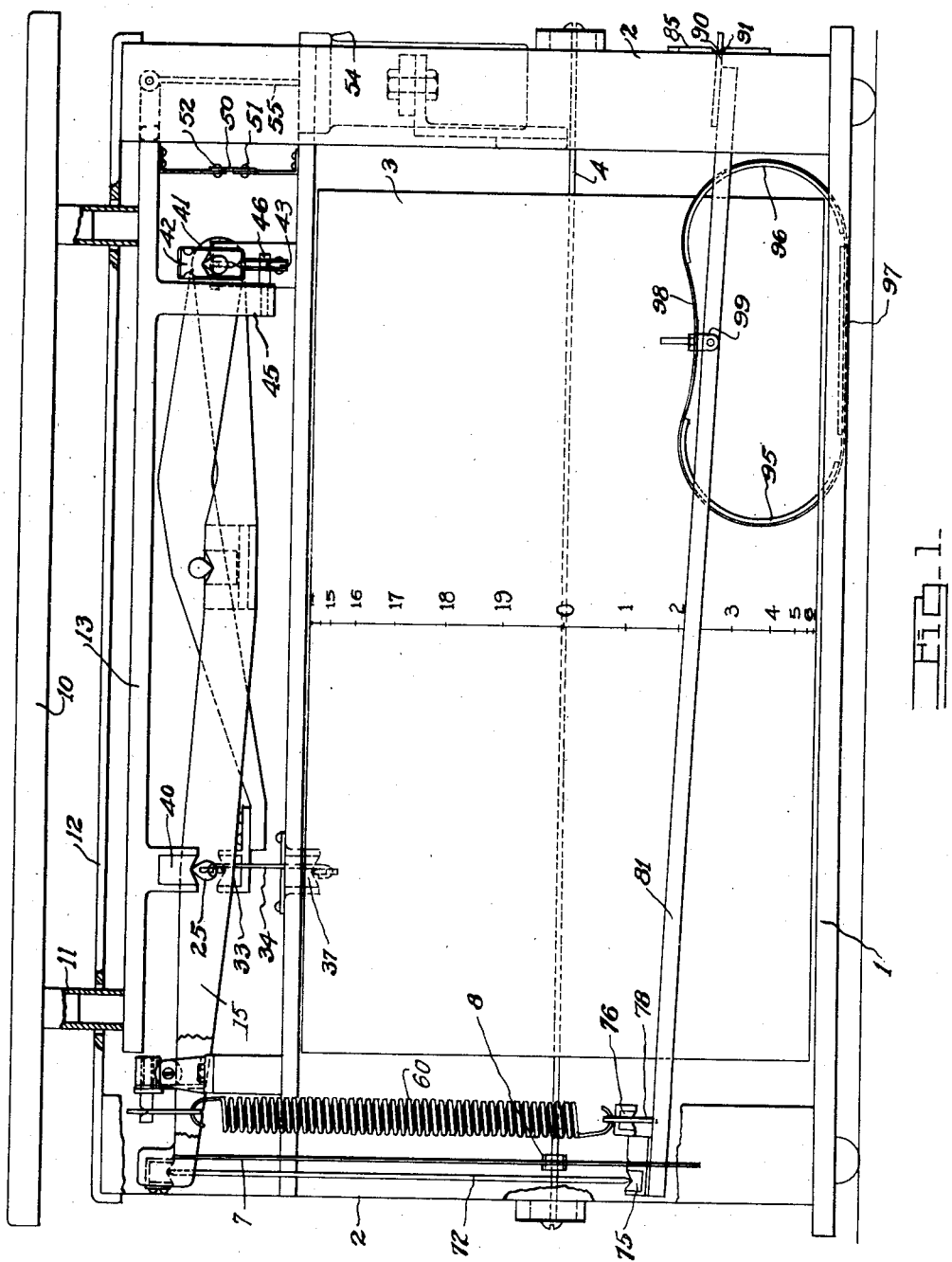

INVENTOR
BERT W. KING.
BY Barnes, Kisselle, Laughlin & Raisch
ATTORNEY

May 17, 1938. B. W. KING 2,117,847
SCALE
Filed April 4, 1936 4 Sheets-Sheet 4
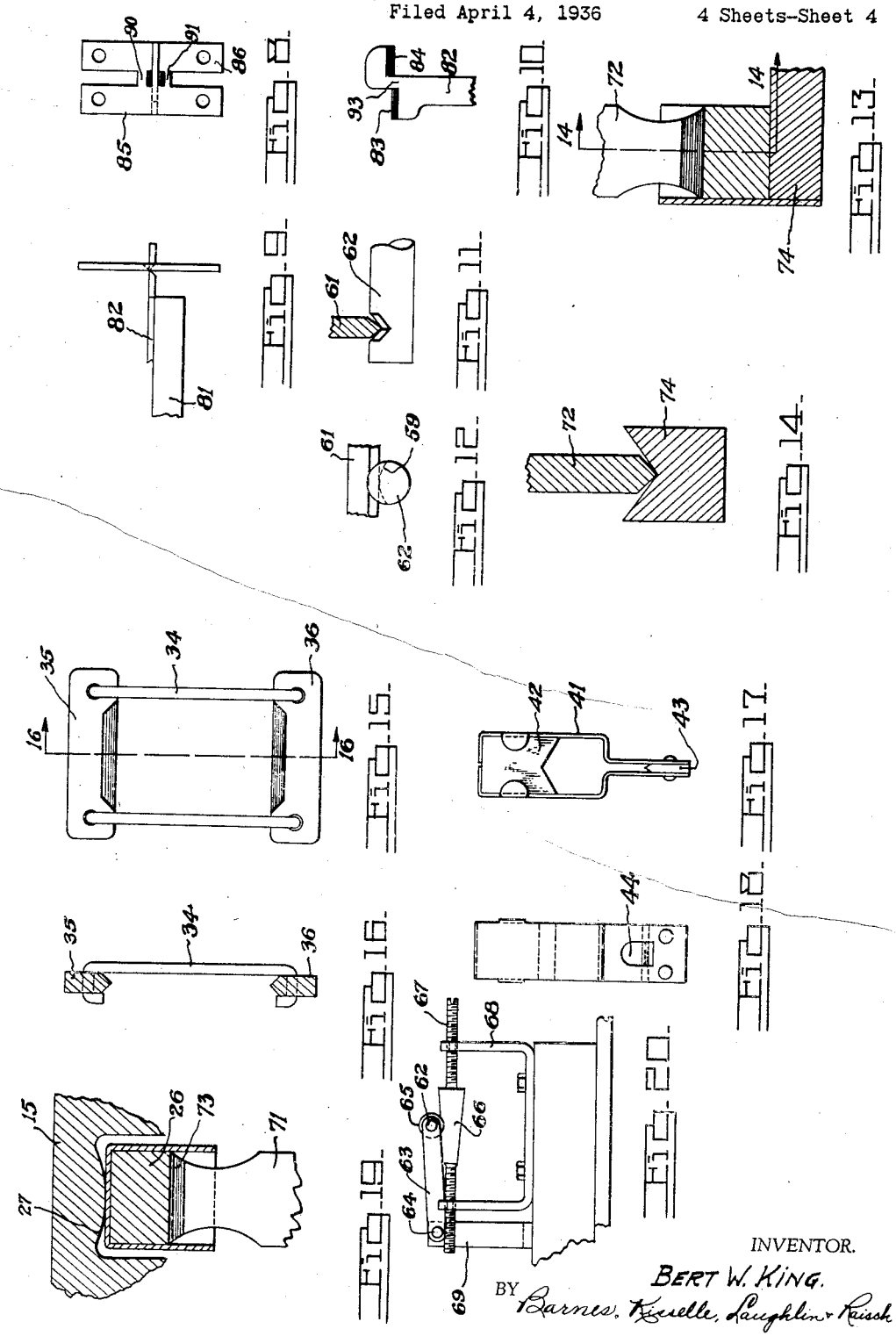
INVENTOR.
BERT W. KING.
BY Barnes, Kisselle, Laughlin & Raisch
ATTORNEY.

Patented May 17, 1938

2,117,847

UNITED STATES PATENT OFFICE 2,117,847

SCALE

Bert W. King, Detroit, Mich.

Application April 4, 1936, Serial No. 72,789

12 Claims. (Cl. 265—39)

This invention relates to a scale, and it has to do particularly with the so-called counter scale ordinarily used on the counter or show case of stores or shops.

The principal object of the invention is to provide a scale structure wherein the load receiving platform is uppermost, with the indicator, such as a drum or chart, located therebelow. Such a scale is of the so-called low type as distinguished from those types having an upwardly projecting column with a chart or drum positioned at the top, and with the load platform at or near the bottom of the column.

Difficulties present themselves in the provision of the so-called low type of scale, and among these is the difficulty of providing suitable stability so that the weighing mechanism is not rendered inaccurate by a load placed near the edge of the platform; the difficulty of positioning of the levers to facilitate stability, having at the same time due regard to the fact that the levers and resistance means as well as the indicator, such as a drum, must be located in compact relation, and in fact what may be termed in overlapping relation. I have provided a scale which overcomes these and other difficulties in the so-called low type of scale, and to this end provided a scale structure wherein the lever system is located immediately above the indicator drum. My scale is a spring scale and the springs in scales must be of the tension type rather than the compression type. Accordingly, with the levers located in rather an upper position, and with tension springs required, some means must be provided for associating the lever system with depending tension springs. Here again difficulties present themselves, and I have provided a push or thrust link arrangement of novel structure through the means of which the load on the levers is suspended by the springs even though the levers and load are above the springs. With my arrangement the scale, platform and lever system may be made relatively long and narrow, thus providing a range of flexibility of design and yet stability is maintained, and the scale will remain in balance even though the same is not in a true level condition. This is accomplished in part by the thrust or push link structure which has a floating action and finds its own perpendicular. These and other objects will become more appreciated as the detailed description progresses with reference to the accompanying drawings.

Fig. 1 is a side elevational view with parts cut away showing the scale structure with the covering housing removed.

Fig. 2 is an end view thereof with the cover removed.

Fig. 3 is a view of the end opposite that of Fig. 2.

Fig. 8 is an end elevational view of a bearing used for a stabilizing link.

Fig. 9 is a side elevational view of the bearing shown in Fig. 8.

Fig. 10 is a plan view of the knife edge member used in the bearing for the stabilizing link.

Fig. 11 is a view partly in section showing the spring suspending bearing.

Fig. 12 is a view taken at right angles to Fig. 11 illustrating the bearing.

Fig. 13 is a sectional view showing a bearing for the thrust link.

Fig. 14 is a sectional view taken on line 14—14 of Fig. 13.

Fig. 15 is a plan view of a hold down link.

Fig. 16 is a sectional view taken substantially on line 16—16 of Fig. 15.

Fig. 17 is a view of a load link used with the scale levers.

Fig. 18 is a side view of the load link taken at right angles to Fig. 17.

Fig. 19 is a detail sectional view of a thrust bearing structure for the push or thrust link.

Fig. 20 is a detail view showing the adjustment and spring suspending structure.

Figure 4:
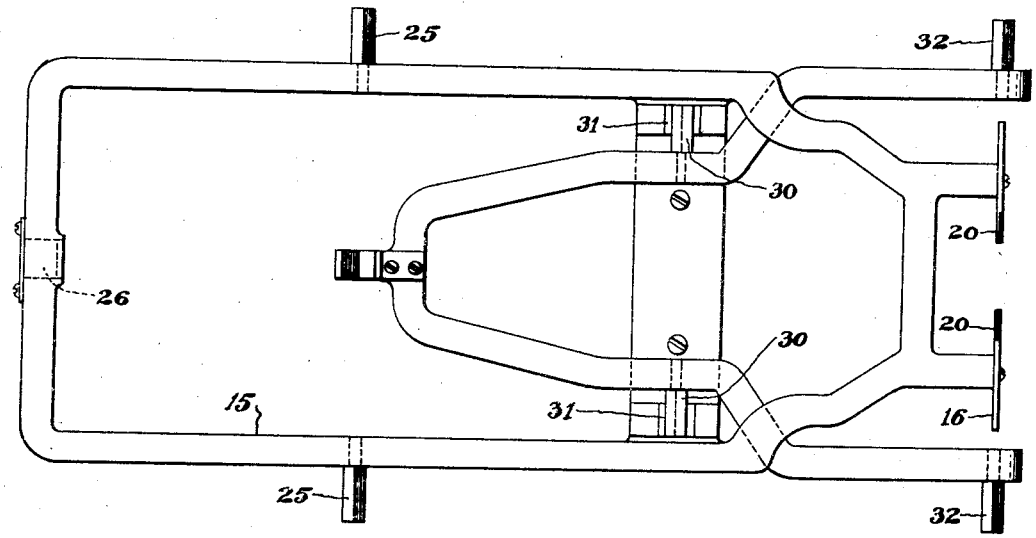
Fig. 4 is a plan view of the lever system.
Figure 5:
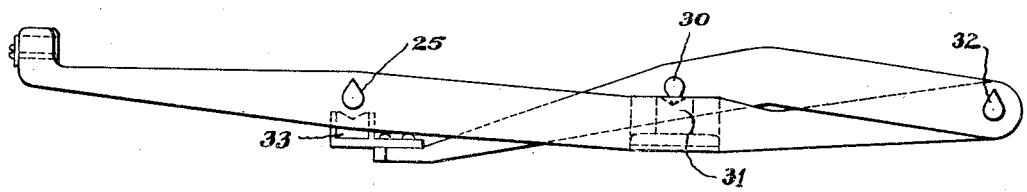
Fig. 5 is a side elevation of the levers.
Figure 6:
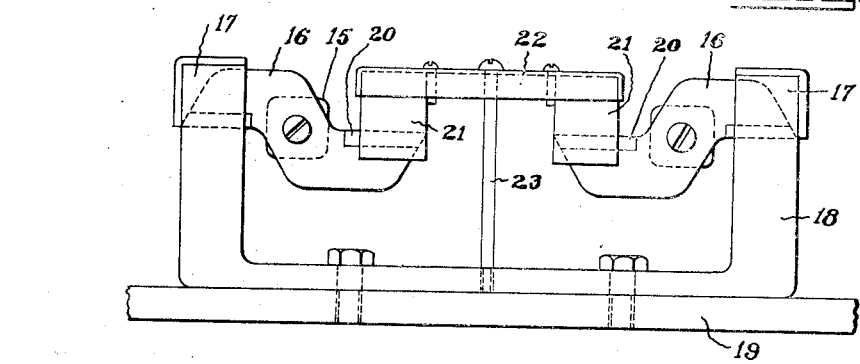
Fig. 6 is an end view of the levers looking from the lower end of Fig. 4.
Figure 7:
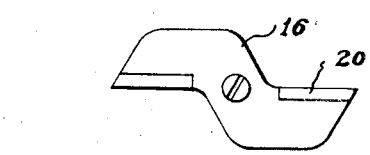
Fig. 7 is a detail of a knife edge bearing.

The scale may have a suitable frame or support provided by a lower or base portion 1 and end members 2. This support structure, however, is subject to variation. These frame or support members may carry a suitable housing, which for the most part is not shown herein. In this support an indicating drum 3 is mounted, an axis member therefor being shown at 4 mounted at its ends in antifriction bearings 5. The bearings may be held in cross pieces 6. The drum, of course, is to have suitable indicia partially shown on Fig. 1, and the housing will have a suitable sight opening as is well known to those versed in the art. At this point it may as well be pointed out that the drum is to be rotated, for which purpose there is a rack 7 which meshes with a pinion 8 on the shaft 4.

A load receiving platform is illustrated at 10 with downwardly extending posts 11 for extending through apertures in the upper part of the housing 12 and which connect with a frame structure underneath the housing 12, as shown at 13. The parts 10, 11 and 13 may be regarded as the load receiving platform, the post structure being necessitated for the purpose of extending through the housing member 12.

A suitable set of levers are mounted on the frame or support structure above the drum. As shown herein this lever system comprises a main load lever and an auxiliary lever arranged to support the platform and which may be resisted by tension springs. This lever system is similar to the lever system shown in my application Serial No. 734,490, filed July 10, 1934. The main load lever 15 (Fig. 4) may be of box structure, as shown. It is equipped with double knife edge bearings. These bearings have downwardly extending knife edges 16 pivoted in V bearings 17 supported in a bracket 18. The bracket may in turn be supported by a cross piece 19 joining the frame members 2 (Fig. 3). The double knife edges have upwardly extending knife edge bearings 20 operating in inverted V bearings 21 mounted in a cap 22 in turn held by a rod 23. These are merely hold-down bearings. The main lever also has upwardly extending knife edge bearings 25. The end of the main lever 15 opposite the knife edge bearings is arranged to be resisted by the springs. As shown in Fig. 19 this end of the lever is provided with an inverted V bearing 26 preferably seated on a curved seat 27, the function of which will later appear.

The auxiliary or secondary lever is pivotally mounted on a fixed pivot to the primary lever. This is provided by knife edge bearings 30 on the secondary lever and V bearings 31 on the primary bearing. These bearings are termed "fixed" in the sense that the knife edge and V bearings move together in the same arc. One end of the secondary lever has upwardly projecting knife edge bearings 32 for receiving a load. The opposite end has a V bearing 33 which constitutes a hold-down bearing. There is a hold-down link 34 with opposed knife edges 35 and 36, one of which functions in the V bearing 33 and the other of which functions in a fixed V bearing 37 carried by the frame (Fig. 1).

The load platform has V bearings 40 for resting upon the knife edges 25. The opposite edge of the load platform is suspended from the knife edge bearings 32 on the secondary lever through the means of links. To this end there are links 41 each with an inverted V bearing 42 and an upwardly extending knife edge 43. These links are formed by suitable metal parts, as shown in Figs. 17 and 18. Each link is provided with an aperture 44. There are two of these links, one suspended from each knife edge 32 as shown in Fig. 1. The platform has depending legs 45 with projecting pins 46. These pins are notched, as shown in Fig. 1, inserted through the apertures 44 and rest upon the knife edges 43. Thus the pins constitute in effect V bearings.

Inasmuch as the links 41 may tend to permit the load platform to shift sidewise, a cross check is provided. This is shown in Fig. 3. This takes the form of an arm 50 having a fixed pivot 51 and pivotally mounted as at 52 to the platform. The cross check is preferably so arranged that when the scale is at half capacity a center line between the points 51 and 52 is in line with the knife edge bearings 16 and 20 of the load lever. Thus in operation the arc taken by the point 52 is equally divided into right and left components, thus reducing the maximum sidewise shift of the platform. In Fig. 3 the cross check and platform are shown substantially in an unloaded condition.

A suitable dash pot is provided which here takes the form of a cylinder 54 with a piston rod 55 connected to the platform. The internal structure of the dash pot is not shown, as a conventional structure may be used.

The load resisting springs are illustrated at 60, and these are suspended from a rocker arm 61 pivotally mounted on a pin 62 (Fig. 2). The supporting structure for the pivot 62 is not shown in Fig. 2, as it would complicate the structure; however, this is shown in Fig. 20. The supporting pin 62 is carried on an arm 63 pivoted as at 64 so that it may be adjusted vertically. An enlarged part 65 is provided, which is grooved to receive a tapered or cone supporting and adjusting member 66. This member 66 is fastened to an adjusting screw 67 journaled in a bracket 68 and screw threaded in a bracket 69. By the use of a suitable tool, such as a screw driver, the cone 67 may be moved to the right or left, thus raising and lowering the pin 62.

The pin 62 (Fig. 11) is notched to form a V bearing, the bottom surface of which is on an arc as at 59, (Fig. 12); and the balance arm 61 has a knife edge bearing for cooperating with this groove. This permits the balance member 61 to rock on the pin with the knife edge shifting or rocking on the curved surface of the V bearing in the pin. The load is communicated to the lower ends of the springs from the main load lever. To this end there is a thrust link 70 of inverted Y-formation having an upwardly extending portion 71 and spaced legs 72. The upper end of the thrust link has a knife edge bearing 73 cooperating with the inverted V bearing 26 (Fig. 19). The lower ends of legs 72 are knife edged to cooperate with V bearings 74 (Figs. 2, 13 and 14), which are carried by the supporting member 75. This supporting member has an inverted knife edge bearing 76, (Fig. 1) and a cross member 78 with a knife edge 79 functions in the bearing 76. The lower ends of the springs 60 are fastened to opposite ends of the cross member 78 as at 80. Thus the load on the platform is communicated through the thrust link structure through the link 71 and associated bearings to the lower ends of the springs.

Stabilizing links are provided for stabilizing the lower end of the springs and lower end of the thrust link. There are two of such links shown at 81, one on each side of the drum and passing along the sides of the drum. These links may be fixedly secured to the support 75. The opposite ends of the links are pivoted preferably with knife edge member 82 (Figs. 8, 9 and 10) fashioned to provide opposite knife edges 83 and 84. Plate members 85 and 86 are grooved to form bearings for the knife edges and are positioned so that one operates on knife edge 83 and one on knife edge 84, thus taking both a thrust and a pull. These plates may be suitably fastened to the frame. One plate member may be formed with opposed knife edges 90 and 91 for engaging respectively above and below the intermediate portion of the member 82 substantially at the point 93 (Fig. 10) and in line with the knife edges 83 and 84.

A suitable thermostatic control element may be provided. This may take the form of a pair of curved bimetallic arms 95 and 96 fastened to the frame as at 97. A ribbon runs over these arms, the ribbon being shown at 98, and is suitably fastened to a moving part of the scale, as for example, one of the stabilizing arms 81, as shown at 99. This tensions upwardly on one arm 81 and the knife edge bearing 90 functions to hold the end of the link 81 down. Only one thermostatic element may be provided, thus the opposite link lies in the knife edge bearings 83, 84, 90 and 91 more or less neutrally.

The rack 7 is pivotally mounted to a moving part of the mechanism, as for example the main lever 15, as shown at 100, and this rack may have an extension 101 which tends to rock the rack around its pivot point, thus keeping the teeth of the rack in mesh with the pinion. Also the rack may be backed up by a roller 102 near the pinion to prevent complete disengagement of the teeth.

In the unloaded condition of the scale the springs serve to elevate the free end of the main lever, and this is substantially the position shown in Figs. 1, 2 and 3, and in this position the cross check 50 takes the position substantially as shown in Fig. 3, and the stabilizing links 81 take the position substantially as shown in Fig. 1. At about half capacity the cross check and stabilizing links are substantially horizontally disposed. The thermostat is coordinated with the springs to take care of temperature variation and maintain scale balance.

When a load is placed upon the scale the load is communicated through the thrust link to the support 75, thence to the lower ends of the springs from which the support is suspended. As the load stretches the springs the levers move downwardly, the rack rotates the drum, and a weight indication may be had. The stabilizing links keep the lower end of the thrust mechanism from swinging from right to left as Fig. 1 is viewed. However, it is to be noted that the thrust link and associated mechanism is capable of some swinging right and left as Fig. 2 is viewed. In this regard it will be appreciated that the knife edge bearing members 82 on the ends of the stabilizing links 81 fit relatively loose in the bearings so that there is no binding. In other words, the lower end of the thrust link, the support 75, the adjacent ends of the stabilizing links 81, and the springs may swing from right to left within, of course, certain mechanical limits, as Fig. 2 is viewed. In this action the V bearing 26 rocks upon the inverted rounded seat 27 and thus the knife edges remain seated in their V's. This is true of the V bearing 26 and V bearings 74. This action may rock the member 61. It is for this reason that the groove or bearing formation in the supporting pin 62 has a curved bottom surface 59, as shown in Fig. 12. Thus there is no binding action. Further, should the scale for any reason be out of level or if it rests upon a counter which varies by the shaking of the floor or the like, the thrust link will tend to find its own perpendicular, and in this manner the scale is maintained in balance. However, swing of the thrust link in the direction of extent of the axis of the drum (from right to left as Fig. 1 is viewed) would throw the scale out of balance, but this is prevented by the link 81.

Reverting to the function of the levers: The main lever moves in an arc around the knife edge bearings 16. The secondary lever moves more or less bodily in this same arc because of the so-called fixed pivot 30, 31. This is permitted by the link hold-down 34. Also, the platform tends to move in this same arc because of the fixed bearing 25, 40. However, the end of the secondary lever opposite the hold-down link moves in a secondary arc around the pivot 30, 31, and this would clash with the arc of movement of the platform. This, of course, is taken care of by the load supporting links 41. Due to the load supporting links 41, the platform, as above pointed out, may shift from right to left as Fig. 3 is viewed, especially at the right hand end thereof as Fig. 1 is viewed. The cross check 50 is provided to check this movement.

Attention is now directed to the spring suspension and adjusting means. The springs are suspended from the pin 62 and the weight is carried on the screw threaded shaft 67 and which is applied directly to the cone 66. One end of the screw 67 is shaped to receive a suitable tool, as for example a screw driver; and by turning the screw to feed it one way or the other the cone is shifted and the pin 62 raised or lowered. The arm 63 may be freely pivoted with the result that the part 65 thereon, in supporting the levers, thrust link structure, springs and stabilizing arms, rests on the cone by the action of gravity.

By placing the levers above the drum and immediately under the platform long platform risers are eliminated. That is long risers connecting the platform to relatively low positioned levers are not needed. This increases the stability of the scale and makes for accuracy in that the torque or tipping action caused by a load placed off center on the platform is minimized.

The levers, preferably, and as shown herein, run parallel to the axis of the drum; and the scale may be made in the desired length, and in fact the width may be decreased, as for example by having a relatively long narrow set of levers; and yet great stability is afforded. Further, this lengthening out of the scale structure and narrowing it does not overbalance the scale as it would in a column type of scale.

It is highly advantageous, particularly in a scale of this type, to have a platform which may have considerable length and width. By providing the lever system shown with all the scale levers above the drum and arranged to provide the four-point support, a platform of large dimensions as to length or width may be provided and at the same time stability maintained. As shown herein the dimensions of the platform are substantially the same as the dimensions of the scale housing. The four points of the suspension may be located at points which approximate the corners of a four-sided figure such as a parallelogram.

I claim:

1. A scale comprising, a support, an indicating drum therein, a set of levers supported by the support, at least one of which is above the indicating drum, a platform constituting the uppermost part of the scale and supported by the levers, resisting spring means, means supported by the support for suspending the spring means from the upper portion of the frame with the spring means depending into the lower portion thereof alongside of one end of the drum, and thrust means extending from a lever above the drum downwardly alongside said end of said drum and operatively connected at its lower end with the lower end of the spring means and a stabilizing link for the lower ends of the thrust means and spring means.

2. A scale comprising, a supporting structure, an indicating drum journaled in the supporting structure, a set of levers mounted on the supporting structure and positioned above the drum, a platform mounted on the levers and constituting the uppermost portion of the scale, resisting springs suspended from the upper portion of the supporting structure and depending alongside one end of the drum, a thrust link interconnecting the lower ends of the springs and a lever, and a stabilizing link pivoted adjacent one end of the drum extending lengthwise of the drum along one side thereof and connected to the lower end of the thrust link.

3. A scale comprising, a supporting structure, an indicating drum journaled in the supporting structure, a set of levers mounted on the supporting structure and positioned above the drum, a platform mounted on the levers and constituting the uppermost portion of the scale, resisting springs suspended from the upper portion of the supporting structure and depending alongside one end of the drum, a thrust link interconnecting the lower ends of the springs and a lever, a pair of stabilizing links pivoted near one end of the drum and extending alongside of the drum, one on each side thereof, and means connecting the ends of the stabilizing link opposite their pivots to the lower end of the springs and thrust link.

4. In a scale, an indicating drum, a set of scale levers mounted above the drum and paralleling the drum, a platform mounted on the levers, resisting spring means suspended from a point in proximity to the levers and depending alongside one end of the drum, a thrust link associated with one of the levers and extending downwardly alongside said end of the drum, means connecting the lower end of the spring means to the thrust link, whereby the spring means supports the levers and platform, and means interconnecting the levers and drum for rotating the drum upon lever actuation.

5. In a scale, an indicating drum, a set of scale levers mounted above the drum and paralleling the drum, a platform mounted on the levers, resisting spring means suspended from a point in proximity to the levers and depending alongside one end of the drum, a thrust link associated with one of the levers and extending downwardly alongside said end of the drum, means connecting the lower end of the spring means to the thrust link, whereby the spring means supports the levers and platform, means interconnecting the levers and drum for rotating the drum upon lever actuation, and a pair of stabilizing arms operatively connected with the lower end of the thrust link and lower end of the spring means, one stabilizing link being on one side of the drum and one on the other and said links extending alongside of the drum and pivotally mounted adjacent the opposite end of the drum.

6. A scale comprising, a platform constituting the uppermost part of the scale, a supporting structure, a set of levers mounted in the upper portion of the supporting structure, bearing means for supporting the platform on the levers, a drum rotatably mounted in the lower portion of the supporting structure and below the levers, resisting spring means, means near the upper portion of the supporting structure for suspending the spring means, with the spring means depending therefrom and extending downwardly alongside one end of the drum, a thrust link extending downwardly from one of the levers alongside said one end of the drum, means interconnecting the lower end of the thrust link and the lower end of the spring means, and a stabilizing arm connected to the said connecting means and extending alongside of the drum, and means pivotally mounting one end of the stabilizing arm at a point near the opposite end of the frame structure from the stabilizing link and spring means.

7. A scale comprising, a platform constituting the uppermost portion of the scale, a supporting structure, a primary lever pivotally mounted on the supporting structure just underneath the platform, a secondary lever pivoted on the primary lever, an indicating drum mounted under the levers, said levers running parallel to the axis of the indicating drum, a fixed pivot connection between the platform and the primary lever, a link connection between the platform and one end of the secondary lever, a hold-down link for the other end of the secondary lever, a cross check substantially at right angles to the drum axis adjacent said links and at one end of the drum and pivotally connected to the platform and the frame structure, resistance spring means depending from the upper portion of the supporting structure and extending downwardly alongside the opposite end of the drum, a thrust link extending downwardly alongside of the spring means and interconnecting one end of the main lever and the lower end of the spring means, and means for rotating the drum upon movement of the levers.

8. In a scale having a rotary indicating drum, a set of levers above the drum, a load receiving platform above the levers, and means connecting a lever and the drum for rotating the drum: resistance spring means, means for suspending the springs with the spring lying along one side of the drum, a thrust link, means connecting the thrust link to the lower end of the spring means, a bearing connecting the upper end of the thrust link to one of the levers, said bearing including relatively rockable portions whereby the thrust link and spring means may rock transversely to the axis of the drum, and stabilizing arms connecting the lower end of the thrust link and spring means and pivoted adjacent the opposite end of the drum for holding the thrust link and springs from substantial swinging in the direction of the drum axis.

9. In a scale having a rotary indicating drum, a set of levers above the drum, a load receiving platform above the levers, and means connecting a lever and the drum for rotating the drum: a rockable supporting member mounted adjacent the lever, a pair of springs depending from opposite ends thereof and extending down along one side of the drum, a thrust link, a knife edge bearing between the upper end of the thrust link and one lever, a curved surface upon which the bearing may rock, a support member attached to the lower end of the springs, bearing means between the lower end of the thrust member and the support member, said support member, springs and thrust member arranged to swing in a direction transverse to the drum axis whereby to seek a perpendicular, and stabilizing links running the direction of the drum axis for holding the thrust member and springs from swinging in the direction of the extent of the drum axis.

10. In a scale, a rotary drum, a set of levers above the drum and operatively connected thereto, a load receiving platform on and above the levers, a rocker arm, a pair of resisting springs suspended from opposite ends thereof and depending alongside one end of the drum, an inverted Y shaped thrust link, a rocking knife edge bearing between the upper end of the thrust link and a lever, a support member attached to the lower ends of the springs, bearing means between the two lower ends of the thrust link and the supporting means, said rocking knife edge bearing permitting the thrust link to swing transversely to the drum axis whereby to seek a perpendicular, and stabilizing links running in the direction of the drum axis and connected to the supporting means.

11. A scale comprising, a supporting structure, an indicating drum journaled in the supporting structure, scale levers including a pair of load supporting levers mounted on the supporting structure and both positioned above the drum, a platform constituting the uppermost portion of the scale, two bearing means on each lever providing a four-point support for the platform with said points spaced relative to each other in the direction of the width and length of the platform, resisting spring means secured to the upper portion of the supporting structure and depending therefrom adjacent one end of the drum, a thrust link interconnecting one lever with the lower end of the resisting spring means, means for rotating the drum incident to lever actuation, and means for stabilizing the lower ends of the thrust link and spring means.

12. A scale comprising, a platform constituting the uppermost portion of the scale, a supporting structure, a primary lever pivotally mounted on the supporting structure just underneath the platform, a secondary lever pivoted on the primary lever, an indicating drum mounted under the levers, said levers running parallel to the axis of the indicating drum, a fixed pivot connection between the platform and one lever, a link connection between the platform and the other lever, means for preventing substantial shift of the platform sidewise on the link connections, resistance spring means depending from the upper portion of the supporting structure and extending downwardly alongside the opposite end of the drum, a thrust link extending downwardly alongside of the spring means and interconnecting one end of the main lever and the lower end of the spring means, and means for rotating the drum upon movement of the levers.

BERT W. KING.